United States Patent

Anderson

[15] 3,670,212

[45] June 13, 1972

[54] CAPACITOR WITH AZEOTROPIC ELECTROLYTE FOR WIDE TEMPERATURE RANGE OPERATION

[72] Inventor: Daniel J. Anderson, Indianapolis, Ind.

[73] Assignee: P. R. Mallory & Co. Inc., Indianapolis, Ind.

[22] Filed: July 9, 1969

[21] Appl. No.: 840,504

Related U.S. Application Data

[63] Continuation-in-part of Ser. No. 648,251, June 23, 1967, abandoned.

[52] U.S. Cl. ........................... 317/230, 317/233, 252/62.2
[51] Int. Cl. ........................................................ H01g 9/00
[58] Field of Search ............... 317/230, 231, 233; 252/62.2

[56] References Cited

UNITED STATES PATENTS

| 2,934,681 | 4/1960 | Ross | 317/230 |
| 2,934,682 | 4/1960 | Schwarz et al. | 317/230 |
| 2,965,816 | 12/1960 | Ross | 317/230 |
| 3,138,746 | 6/1964 | Burger et al. | 317/230 |
| 3,539,881 | 11/1970 | Anderson | 317/230 |

*Primary Examiner*—James D. Kallam
*Attorney*—Richard H. Childress, Robert F. Meyer, Henry W. Cummings and C. Carter Ells

[57] ABSTRACT

An electrolyte comprising a binary organic system which forms in the correct proportions an azeotropic composition having a boiling point higher than that of either of the system's pure components and a solvent inert to the azeotropic mixture.

10 Claims, No Drawings

CAPACITOR WITH AZEOTROPIC ELECTROLYTE FOR WIDE TEMPERATURE RANGE OPERATION

This application in a continuation-in-part of application, Ser. No. 648,251 filed June 23, 1967, now abandoned.

Prior to this invention, existing capacitor electrolytes were for the most part, based on ethylene glycol as a solvent. With this solvent, unless water is added to the electrolyte, the resistance of the electrolyte will be relatively high, and the capacitance of the capacitor made with the electrolyte will fall off sharply at temperatures of about −40° C. or below. If water is added to the electrolyte, the stability of the capacitor on life test is usually adversely affected. In addition, capacitor failures due to the buildup of internal pressures are more likely to occur.

In some previous work that has been done in attempts to solve this problem, glycol ethers have been used as the solvents. Also, work has been done with dimethylformamide, nitrides and other organic solvents. While these solvents will function well in capacitors having good sealing characteristics, their use has proven impractical in many applications where electrolyte vapor pressure is a problem; that is, in applications where diffusion through the casing material and end seals leads to a gradual loss in the quantity of electrolyte remaining in the capacitor.

It is, therefore, an object of the present invention to provide an electrolyte of low volatility for a capacitor which is consistently operable at wide temperature ranges, such as of from about +85° C. to below about −40° C.

It is another object of the invention to provide an electrolyte for a capacitor in which the sealing characteristics are not of the highest quality.

Another object of the invention is to provide a capacitor electrolyte which has good shelf life.

The invention in its broadest aspect contemplates providing an electrolyte from an organic system which forms, in the correct proportions, an azeotropic, or constant-boiling composition, having a boiling point higher than that of any of the system's pure components and a solvent inert to the azeotropic mixture.

It has long been known that constant boiling mixtures are formed with many binary or ternary organic systems. In most cases, the boiling point of the azeotrope is less than that of either pure component. Such a mixture would have a high vapor pressure, thus making the capacitor characteristics readily susceptible to loss of the electrolyte. This type of mixture would, therefore, be of little value in an electrolyte for a capacitor.

In accordance with the present invention, an electrolyte is formed from an organic acidic material, and a basic material, both of which are liquid, and which are so proportioned that the boiling point of the mixture is higher than that of any of the pure components of the system and having a solvent added thereto which is inert to the azeotropic mixture. Preferably the solvent will lower the freezing point. When an organic acidic material and an organic basic material, both of which are liquids, comprise the system, intermolecular attraction results in such an azeotrope. The capacitor in which the electrolyte is used will deteriorate substantially less through the loss of an individual component of the electrolyte. Rather, because of the increased boiling point, the vapor pressure of the mixture is lowered thus causing the electrolyte to be more stable. Any losses of acidic and basic constituents from the electrolyte will be in about the same ratio as found in the electrolyte, hence the electrolyte composition will remain stable, even though the total amount of electrolyte may be gradually diminished.

The acidic materials to be used in the electrolyte of the present invention are liquid organic acidic materials. Most of the acidic materials to be used in accordance with the present invention will have the formula RCOOH wherein R may be hydrogen, alkyl or alkylene, straight or branched chains. Preferably R is H, lower alkyl or lower alkylene with 1 to 6 carbon atoms. Exemplary acids include formic, acetic, propionic, propenoic, butenoic and pentenoic acids. Additionally, non-chloride substitution may take place. For example, trifluoacetic acid may be used.

Another acidic material which may be used is phenol $C_6H_5OH$ and lower alkyl substituted phenols, preferably having one to three carbon atoms.

The basic substances may be generally divided into two groups, those having the formula

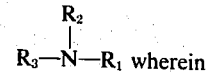

$R_3-N-R_1$ wherein $R_1$ $R_2$ $R_3$ may be hydrogen, alkyl or alkylene, with straight or branched chains. Preferably, $R_1$ $R_2$ and $R_3$ are H, lower alkyl or lower alkylene groups having one to six carbon atoms. Additionally, non-chloride substitution of the alkyl or alkylene chain may be had. For example, fluoride may be substituted onto the chains.

The second group of basic materials may be classified heterocyclic nitrogen containing compounds. For example, pyridine and substituted pyridine compounds may be utilized. Likewise, pyrroles and substituted pyrroles may be utilized. The substituents on the pyridine and pyrrole type compounds (other item H) are alkylene or alkyl, preferably lower, most preferably having one to four carbon atoms. Also, the presence of one or more non-chloride substituents would not be disadvantageous. Examples include methyl substituted pyridines including 2-picoline, 3-picoline, 4-picoline, 2-ethyl pyridine, 3-proplpyridine, 4-butyl pyridine. Likewise, methyl, ethyl and propyl groups preferably no more than one may be substituted onto the pyrrole molecules.

Tabulated below in Table I are several examples of organic acidic materials and organic basic materials which may be used which will yield the desired azeotropic mixtures with their boiling points and the boiling points of the mixtures.

TABLE I

| A | B | B.P. of A | B.P. of B | B.P. of Azeotrope |
|---|---|---|---|---|
| Acetic acid | Triethylamine | 118°C | 90°C | 163°C |
| Acetic acid | Trimethylamine | 118°C | 3.5°C | 148–150°C |
| Acetic acid | Pyridine | 118°C | 115°C | 139–141°C |
| Propionic acid | Triethylamine | 141°C | 90°C | 168°C |
| Propionic acid | Pyridine | 141°C | 115°C | 148–150°C |
| Phenol | 4-picoline | 182°C | 143°C | 190°C |

In order to achieve the azeotrope with the higher boiling point, the proportion of acid to base should be carefully controlled. Presented in tabular form in Table II, the preferred proportions by weight are as follows:

TABLE II

| A | B | Ratio of A to B |
|---|---|---|
| Acetic acid | Triethylamine | 69:31 |
| Acetic acid | Trimethylaine | 80:20 |
| Acetic acid | Pyridine | 53.47 |
| Propionic acid | Triethylamine | 73:27 |
| Propionic acid | Pyridine | 74:26 |
| Phenol | 4-picoline | 65.5:34.5 |

The proportions of other compounds falling within the acidic and basic substances of the present invention can either be determined from data tabulated in handbooks or simple experiments may be carried out to determine the azeotropic mixture composition and whether or not the boiling point of the azeotropic mixture is higher than the boiling point of the components. It is only in the latter event that the composition is intended to fall within the scope of the present invention.

Although the azeotropic system possesses desirable low temperature characteristics, it has also been found that when the azeotropic electrolyte is combined with selected solvents that are inert to the azeotropic system and have a wide span between freezing point and boiling point, the freezing point of the system can be lowered to thus improve the performance of the capacitor. For low volatility and for good low temperature performance, the boiling point of the solvent should usually be at least 100° C. and freezing points usually lower than −55° C.

In general, suitable solvents include ketones, ethers, alcohols, esters, and mixtures thereof.

As the ketones which may be used, in general, will have the formula

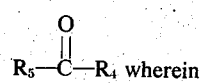

$$R_5-C(=O)-R_4 \text{ wherein}$$

$R_4$ and $R_5$ are alkyl or alkylene, straight or branched chains, which may contain nonchloride substituted groups. Preferably $R_4$ and $R_5$ total at least five carbon atoms. Generally, they will total five to 15 carbon atoms, most preferably six to 10 carbon atoms. Exemplary ketones include methyl isoamyl ketone and isobutyl heptyl ketone.

The alcohols which may be used as, or in the solvent are preferably straight or branched chains and have at least four carbon atoms and usually not more than 15 carbon atoms, preferably five to 10 carbon atoms. Exemplary alcohols include 2-ethyl butanol and normal pentanol.

Ethers also may be utilized as, or in the solvent of the present invention. In general, the ethers should have at least 6 carbon atoms and usually will not have more than 15 carbon atoms. Of course, the ethers must have at least one oxygen, but they may have more than one oxygen. Examples include ethylene glycol monomethyl ether, diethylene glycol monethyl ether, propylene glycol monopropyl ether, and propylene glycol monobutyl either.

The esters which may be used in the solvent of the present invention should have at least 4 and preferably 5 carbon atoms. As is well known in the art, esters are formed from reaction of an acid with an alcohol. With alcohol having one OH group, monoesters are obtained; with alcohols having 2 or a plurality of OH groups, di and tri esters, for example, are obtained. Preferred esters are the acetates, propionates and butyrates. Exemplary esters include amyl acetate, ethylene glycol monomethyl ether acetate and amyl propionate.

The following Table III lists exemplary solvents that have been found to be acceptable along with their boiling and freezing points.

TABLE III

| Solvent | B.P. °C | F.P. °C |
|---|---|---|
| methyl isoamyl ketone | 145 | −74 |
| isobutyl heptyl ketone | 218 | −75 |
| 2-ethyl butanol | 147 | −114 |
| ethylene glycol monomethyl ether | 135 | −100 |
| n-pentanol | 138 | −78 |
| diethylene glycol monoethyl ether | 194 | −85 |
| amyl acetate | 146 | −100 |
| "methyl cellosolve" acetate | 145 | −65 |
| propylene glycol monopropyl ether | 150 | −80 |
| propylene glycol monobutyl ether | 170 | −80 |

In general, in order to keep the conductivity of the electrolyte within reasonable limits, the volume ratio of the solvent to the azeotrope should preferably be from a minimum of one volume of solvent to three volumes of azeotrope, to a maximum of 5 volumes of solvent to one volume of azeotrope. In applications in which electrolyte conductivity is not a problem, even higher ratios of solvent to azeotrope mixture may be used.

While the present electrolyte has been found to be quite adaptable to operation in a wide temperature range, including for example, about +85° C. and higher to below about −40° C. without major deterioration of the capacitor, it has been found that in order to improve the electrolyte's shelf life (periods when not in use), a minor amount of an inhibitor may be added when the electrolyte is to be used in applications requiring considerable shelf life. To this end, it has been found that, for the above acidic and basic materials, phosphoric or phosphorous acid or soluble (in the electrolyte) organic or inorganic salt such as phosphates, phosphonates, phosphites may be added to improve the shelf life of the electrolyte. Preferably the amount added is based on the amount of azeotrope, from about 0.1 percent to 1 percent by weight.

The electrolyte of the present invention can be utilized in a wide range of capacitors. The electrolyte can be used in impregnated type capacitors wherein paper, cellulosic fiber or polymeric separators may be used. The separators are, as is well known, placed between film-forming metal electrodes. While the film-forming metal may be any of the known metals for this purpose including titanium, zirconium, niobium; tantalum and aluminum are preferred. The impregnated capacitor may be of the flat type or of the wound type.

The electrolyte can also be used in the wet type of capacitor. The anode may be made of any of the above-mentioned film-forming metals. The can may be made of a film-forming metal, or another metal such as silver or gold and if desired may be reinforced with another metal, for example steel, including stainless, copper, or copper alloys.

EXAMPLE I

An electrolyte having the following composition was prepared by mixing the constituents in a suitable beaker in liquid form.

138 grams glacialacetic acid
62 grams triethylamine
1 gram 85% phosphoric acid

To this mixture there was added a solvent of methyl isoamyl ketone in a 1:1 volume ratio.

To determine if the azeotropic composition was affected by the addition of the ketone, a sample of the electrolyte was raised in temperature until boiling occurred. No appreciable boiling was noted until the temperature reached 142°C, which is close to the boiling point of the ketone. Further heating caused additional boiling in the 144°–146° C. range. After half the ketone had been boiled off, the electrolyte temperature was reduced to 30° C. and the resistance measured. The reading of 280 ohms indicated that the electrolyte composition was again approaching that of the basic azeotrope, and that the proportions of acetic acid to triethylamine were essentially unchanged.

EXAMPLE II

The electrolyte produced in Example I was introduced into a number of ⅜-inch diameter aluminum case axial lead capacitors of 15/16-inch length. The end seals of the capacitors were made of molded phenolic material, with a rubber o-ring gasket. The capacitors were rated at 25 mfd. at 30 volts. The capacitors were compared with capacitors using a standard glycol-borate electrolyte. Cold tests were made with the result shown in Table IV. In the Table IV, C is capacitance in microfarads, and R is resistance in ohms.

TABLE IV

| Temperature | Glycol Borate | | Azeotrope-Solvent | |
|---|---|---|---|---|
| | C | RxC | C | RxC |
| +25°C | 25.7 | 62 | 26.0 | 44 |
| −20°C | 23.6 | 440 | 24.8 | 88 |
| −30 | 21.2 | 1030 | 24.4 | 130 |
| −40 | 16.2 | 2720 | 23.9 | 270 |
| −55 | 5.0 | 6500 | 22.0 | 730 |

From Table IV, it is readily seen that there is a remarkable improvement over the standard glycol-borate electrolyte in terms of the lower resistivities, especially at the lower temperatures, and the relatively constant value of the capacitance.

EXAMPLE III

Life tests were also run on the capacitors produced in Example II with results being tabulated below in Table V. In the data the following nomenclature is used:

C = capacitance in microfarads
%DF = percent dissipation factor

IDC = direct current leakage at rated voltage measured after 3 minutes electrification

TABLE V

|  | Initial (percent) | | | Initial (percent) 500 hours at 85° C. | | |
| --- | --- | --- | --- | --- | --- | --- |
|  | C | DF | IDC | C | DF | IDC |
| A. 85° C. life test: | | | | | | |
| Glycol-borate | 100 | 4.8 | 0.73 | 98.5 | 5.3 | 0.1 |
| Azeotrope-solvent | 100 | 3.1 | 0.95 | 97.5 | 3.0 | 0.15 |
| B. 85° C. shelf life (soak) test: | | | | | | |
| Glycol-borate | 100 | 5.6 | 0.90 | 96.9 | 4.7 | 3.8 |
| Azeotrope-solvent | 100 | 3.1 | 0.30 | 95.4 | 2.9 | 3.0 |

From the test data and the foregoing description it is apparent that the present invention provides a novel electrolyte which gives good operating characteristics for capacitors operating in a wide temperature range, for example from about +85° C. to below about −40° C.

As many different embodiments of this invention may be made without departing from the spirit and scope hereof, it is to be understood that the invention is not limited to the specific embodiments hereof, except as defined in the appended claims and in accordance with the doctrine of equivalents.

What is claimed is:

1. A capacitor comprising:
   at least one first electrode made of a film-forming metal, and having a dielectric oxide thereon;
   a second electrode made of a conductive material;
   an electrolyte in contact with the dielectric oxide on said film-forming metal and said second electrode, said electrolyte comprising:
   an organic system composed of a liquid organic acidic material and an organic basic material;
   said acid and base being in such proportions as to constitute an azeotropic composition having a boiling point higher than the pure components of such system; and
   a solvent inert to said azeotropic composition, said solvent having a boiling point of at least about 100° C. and a freezing point below about −55° C.
   said capacitor also having means for electrically connecting said capacitor into an electrical circuit.

2. A capacitor according to claim 1 in which between said first and second electrode a fibrous material is placed and said electrolyte is impregnated into said fiberous material.

3. A capacitor according to claim 2 in which said first and second electrode, and said fibrous material are wound in a concentric fashion.

4. A capacitor according to claim 2 in which said fiberous material is selected from the group consisting of paper, cellulose and polymeric separators.

5. A capacitor according to claim 1 in which said capacitor is of the wet electrolyte type.

6. A capacitor according to claim 1 in which said first electrode is formed from a film-forming metal selected from the group consisting of tantalum, niobium, zirconium, titanium and aluminum.

7. A capacitor according to claim 1 in which said solvent is selected from the group consisting of ketones, ethers, alcohols, esters and mixtures thereof.

8. A capacitor according to claim 1 in which said acidic materials is selected from the group consisting of acids having the formula RCOOH where R is hydrogen, alkyl or alkylene; phenols and substituted phenols; and mixtures thereof.

9. A capacitor according to claim 1 in which the basic substance is selected from the group consisting of amines having the formula

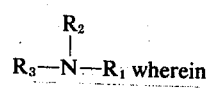

wherein $R_1$, $R_2$ and $R_3$ may be hydrogen, alkyl, or alkylenes; and heterocyclic ring compounds having at least one nitrogen atom.

10. A capacitor according to claim 9 in which said basic substance consists of a hetrocyclic ring compound in which the ring has either 5 or 6 members.

* * * * *